(12) United States Patent

Khammassi et al.

(10) Patent No.: US 12,646,789 B2

(45) Date of Patent: Jun. 2, 2026

(54) METAL ION BATTERY SAFETY ARRANGEMENT

(71) Applicant: EnerSys Delaware Inc., Reading, PA (US)

(72) Inventors: Montassar Khammassi, Arras (FR); Rhodri Evans, Newport (GB)

(73) Assignee: EnerSys Delaware Inc., Reading, PA (US)

( * ) Notice: Subject to any disclaimer, the term of this patent is extended or adjusted under 35 U.S.C. 154(b) by 726 days.

(21) Appl. No.: 18/067,262

(22) Filed: Dec. 16, 2022

(65) Prior Publication Data

US 2023/0198082 A1      Jun. 22, 2023

(30) Foreign Application Priority Data

Dec. 17, 2021     (EP) ..................................... 21306840

(51) Int. Cl.
 *H01M 50/317*          (2021.01)
 *H01M 50/103*          (2021.01)
         (Continued)

(52) U.S. Cl.
 CPC ....... *H01M 50/317* (2021.01); *H01M 50/103* (2021.01); *H01M 50/107* (2021.01); *H01M 50/116* (2021.01); *H01M 50/172* (2021.01); *H01M 50/383* (2021.01); *H01M 10/0525* (2013.01)

(58) Field of Classification Search
 CPC ............. H01M 50/317; H01M 50/107; H01M 50/116; H01M 50/103
 See application file for complete search history.

(56) References Cited

U.S. PATENT DOCUMENTS

| | | | |
|---|---|---|---|
| 2006/0091856 A1* | 5/2006 | Lee ..................... | H01M 50/213 320/116 |
| 2010/0239895 A1* | 9/2010 | Yang ................... | H01M 50/119 429/53 |

(Continued)

FOREIGN PATENT DOCUMENTS

| | | |
|---|---|---|
| DE | 102021000029 A1 | 7/2021 |
| EP | 3269540 A1 | 1/2018 |

(Continued)

OTHER PUBLICATIONS

Communication pursuant to Article 94(3) EPC for EP Application No. 21306840.6 mailed Apr. 24, 2024, 4 pages.

(Continued)

*Primary Examiner* — Kenneth J Douyette
(74) *Attorney, Agent, or Firm* — Myers Bigel, P.A.

(57)          ABSTRACT

The present invention concerns a fire safety arrangement for a battery. More particularly, but not exclusively, this invention concerns a fire safety arrangement for a metal ion battery, for example a lithium ion battery cell. The metal ion battery cell comprises a plurality of electrodes and an electrolyte encased within a housing. The housing comprises a safety valve or vent to allow gas build up within the housing to vent outside the housing, and a fabric envelope surrounding the housing. Any sparks generated by the battery are contained within the fabric envelope, thereby reducing or eliminating the chances of fire or explosion.

13 Claims, 3 Drawing Sheets

(51) Int. Cl.
| | |
|---|---|
| *H01M 50/107* | (2021.01) |
| *H01M 50/116* | (2021.01) |
| *H01M 50/172* | (2021.01) |
| *H01M 50/383* | (2021.01) |
| *H01M 10/0525* | (2010.01) |

(56) References Cited

U.S. PATENT DOCUMENTS

| | | | |
|---|---|---|---|
| 2019/0305287 A1 | 10/2019 | Matsui et al. | |
| 2021/0074960 A1 | 3/2021 | Stude et al. | |
| 2021/0143492 A1* | 5/2021 | Zagrodnik | .......... H01M 50/249 |
| 2023/0035826 A1* | 2/2023 | Stude | ...................... B32B 5/022 |

FOREIGN PATENT DOCUMENTS

| | | | |
|---|---|---|---|
| EP | 3823080 A1 | 5/2021 |
| WO | 2021022130 A1 | 2/2021 |
| WO | 2021140167 A1 | 7/2021 |

OTHER PUBLICATIONS

Extended European Search Report for EP Application No. 21306840.6 mailed Jun. 24, 2022, 9 pages.

* cited by examiner

METAL ION BATTERY SAFETY ARRANGEMENT

RELATED APPLICATIONS

This application claims priority from European Patent Application No. EP21306840.6, filed Dec. 17, 2021, the disclosure of which is incorporated by reference in its entirety.

FIELD OF THE INVENTION

The present invention concerns a fire safety arrangement for a battery. More particularly, but not exclusively, this invention concerns a fire safety arrangement for a metal ion battery, for example, a lithium ion battery.

BACKGROUND OF THE INVENTION

Metal ion batteries, for example lithium ion batteries may be vulnerable to fires as a result of thermal runaway. Thermal runaway may occur when a fault within a battery causes an exothermic reaction, with the reaction rate increasing as temperature increases, to a point where the battery is increasing in temperature at a greater rate than the battery loses heat to its surroundings. The battery temperature will continue to rise, thereby causing the exothermic reaction rate to also increase. As thermal runaway occurs, gases are produced, and usually vented to the surroundings of the battery to prevent pressure increasing within the battery to a point where the battery casing ruptures. The gases may be flammable, for example methane, or ethylene dihydrogen. The decomposition of the battery during thermal runaway may also produce sparks, which can exit the battery via the same route as the gases, which may cause ignition of the gases, resulting in a fire and/or explosion The present invention seeks to mitigate the above-mentioned problems. Alternatively or additionally, the present invention seeks to provide an improved battery safety arrangement.

SUMMARY OF THE INVENTION

The present invention provides, according to a first aspect, a metal ion battery cell comprising a plurality of electrodes and an electrolyte encased within a housing, the housing comprising a safety valve or vent configured to allow gas build up within the housing to vent outside the housing, and a fabric envelope surrounding the housing, such that sparks generated by the battery cell are contained by the fabric envelope.

The fabric envelope prevents sparks generated by the battery cell during a thermal runaway, which pass through the safety valve, from igniting gases which may be proximate to the battery cell. Therefore, the chances of the gases igniting are reduced or eliminated.

The metal ion battery cell may be a lithium ion battery cell. The lithium ion battery cell may be a prismatic lithium ion battery cell. The lithium ion battery cell may be a cylindrical lithium ion battery cell. The lithium ion battery cell may be a pouch lithium ion battery cell.

The metal ion battery may be a sodium ion battery cell, a potassium ion battery cell, an aluminium ion battery cell, or a magnesium ion battery cell.

The fabric envelope may fully surround the housing such that little or no oxygen is present between the housing and the envelope. The fabric envelope may be gas permeable, to allow gas to pass from within the envelope to outside the envelope when the pressure within the envelope is greater than the pressure outside the envelope. The fabric envelope may be such that when there is no pressure difference between the inside of the envelope and the outside of the envelope, little or no gas passes through the fabric envelope.

The safety valve may be a one way valve arranged to open at 0.9 MPa, or 0.9 MPa±0.2 MPa pressure within the metal ion battery cell or any other opening pressure as conventionally used for safety valves for metal ion battery cells. The safety vent may provide an aperture though which excess gases may pass at atmospheric pressure. The material of the fabric envelope may be chosen to allow gas to pass through the fabric when the pressure within the envelope is 0.9 MPa, or 0.9 MPa±0.2 MPa or any other opening pressure as conventionally used for safety valves for metal ion battery cells. Such an arrangement may prevent back-pressure at the safety valve, which may potentially represent a risk, as pressure within the battery housing may otherwise increase to undesirable levels. The gas permeability of the fabric envelope may be adjusted by altering the thickness of fabric, the weave of fabric, the number of layers of fabric, and the type of fabric chosen. Alternatively or additionally, the fabric envelope may comprise a safety value configured to allow gas build up between the housing and the envelope to vent to the surroundings. In such an arrangement, the material from which the fabric envelope is made may be gas impermeable.

The skilled person will appreciate that the thickness and the density of the fabric envelope may be varied in order to provide the required gas permeability and/or spark arresting characteristics, for example increasing the density of the fabric envelope may allow a decrease in the thickness of the fabric envelope, and vice versa. Such variation comprises routine experimentation, and allows the skilled person to easily adapt the fabric envelope to meet specific use requirements.

The fabric envelope may be elastically deformable, for example due to the weave of a fibre making up the fabric envelope. The fabric envelope may stretch if the housing it surrounds increases in size, which may happen during a thermal runaway. Whilst a limited amount of stretch may be allowed, the fabric envelope may be arranged such that beyond a stretch limit, the envelope resists the expansion of the housing it surrounds. The fabric envelope may expand, or swell, when gas is released through the safety valve or vent of the housing. In such a scenario, the housing may become surrounded by a small amount of flammable gas, but without the presence of oxygen between the housing of the battery and the fabric envelope, the fire risk is removed. Once the pressure within the fabric envelope reaches a threshold value, the gas may pass through the envelope, by passing through the fabric of the fabric envelope directly or through a safety valve in the fabric envelope, to the outside of the fabric envelope where it may disburse to the local environment. If a spark escapes through the safety valve of the housing, the fabric envelope contains the spark within the oxygen-low or oxygen-free environment within the housing, thereby preventing a fire or explosion.

The fabric envelope may comprise a heat resistant material, for example being heat resistant up to 1200 degrees Celsius. The heat resistance will prevent the increased temperature of a battery cell during a thermal runaway event from damaging, for example igniting, the fabric envelope, and will ensure that the fabric envelope is still able to arrest sparks during the thermal runaway event. The fabric envelope may comprise a felt material needled to or between one or more woven fabrics, for example a woven glass or silica fabric. The felt material may be manufactured by matting, condensing, and/or pressing fibres together. The felt material may be a non-woven material. A felt filter may be positioned to cover the safety valve or vent of the metal ion battery, such that the fabric envelope also surrounds the felt filter. A fabric strip may be positioned to cover the safety valve or vent of the metal ion battery, such that the fabric envelope also surrounds the fabric strip. A felt filter and fabric strip may be combined to cover the safety valve or vent of the metal ion batter, such that the fabric envelope also surrounds the felt filter and fabric strip.

The fabric envelope may comprise at least one connection port or opening, the connection port or opening allowing wires to pass through the fabric envelope and connect to terminals of the lithium ion battery cell.

According to a second aspect, the invention comprises a plurality of metal ion battery cells, each metal ion battery cell comprising a plurality of electrodes and an electrolyte encased within a housing, the housing comprising a safety valve or vent configured to allow gas build up within the housing to vent outside the housing, the plurality of metal ion battery cells arranged to form a cell stack, and a fabric envelope surrounding the cell stack. For example, the invention may comprise four lithium ion battery cells linked in series and forming a cell stack. The plurality of lithium ion battery cells may comprise a single fabric envelope which surrounds the cell stack. The plurality of metal ion battery cells may comprise a power module. The plurality of metal ion battery cells may comprise a battery pack. The battery pack may comprise one or more power modules.

According to a third aspect, the invention comprises a power module, the power module comprising a plurality of metal ion battery cells, the plurality of metal ion battery cells encased within a housing, the housing comprising a safety valve or vent configured to allow gas build up within the housing to vent outside the housing, and a fabric envelope surrounding the housing, such that sparks generated by the battery cell are contained by the fabric envelope.

According to a fourth aspect, the invention comprises battery pack, the battery pack comprising one or more power modules, each power module comprising a plurality of metal ion battery cells, the one or more power modules encased within a housing, the housing comprising a safety valve or vent configured to allow gas build up within the housing to vent outside the housing, and a fabric envelope surrounding the housing, such that sparks generated by the battery cell are contained by the fabric envelope. According to a fifth aspect of the invention there is also provided a method of manufacturing a metal ion battery cell according to the first aspect of the invention, the method comprising the steps of: placing a metal ion battery cell in a fabric envelope, such that the housing of the metal ion battery cell is surrounded by the fabric envelope.

It will of course be appreciated that features described in relation to one aspect of the present invention may be incorporated into other aspects of the present invention. For example, the method of the invention may incorporate any of the features described with reference to the apparatus of the invention and vice versa. As another example, any features described with reference to the first aspect of the invention may be incorporated into the second, third, fourth, or fifth aspects of the invention, and vice versa.

DESCRIPTION OF THE DRAWINGS

Embodiments of the present invention will now be described by way of example only with reference to the accompanying schematic drawings of which.

DETAILED DESCRIPTION

Figures 1, 2:
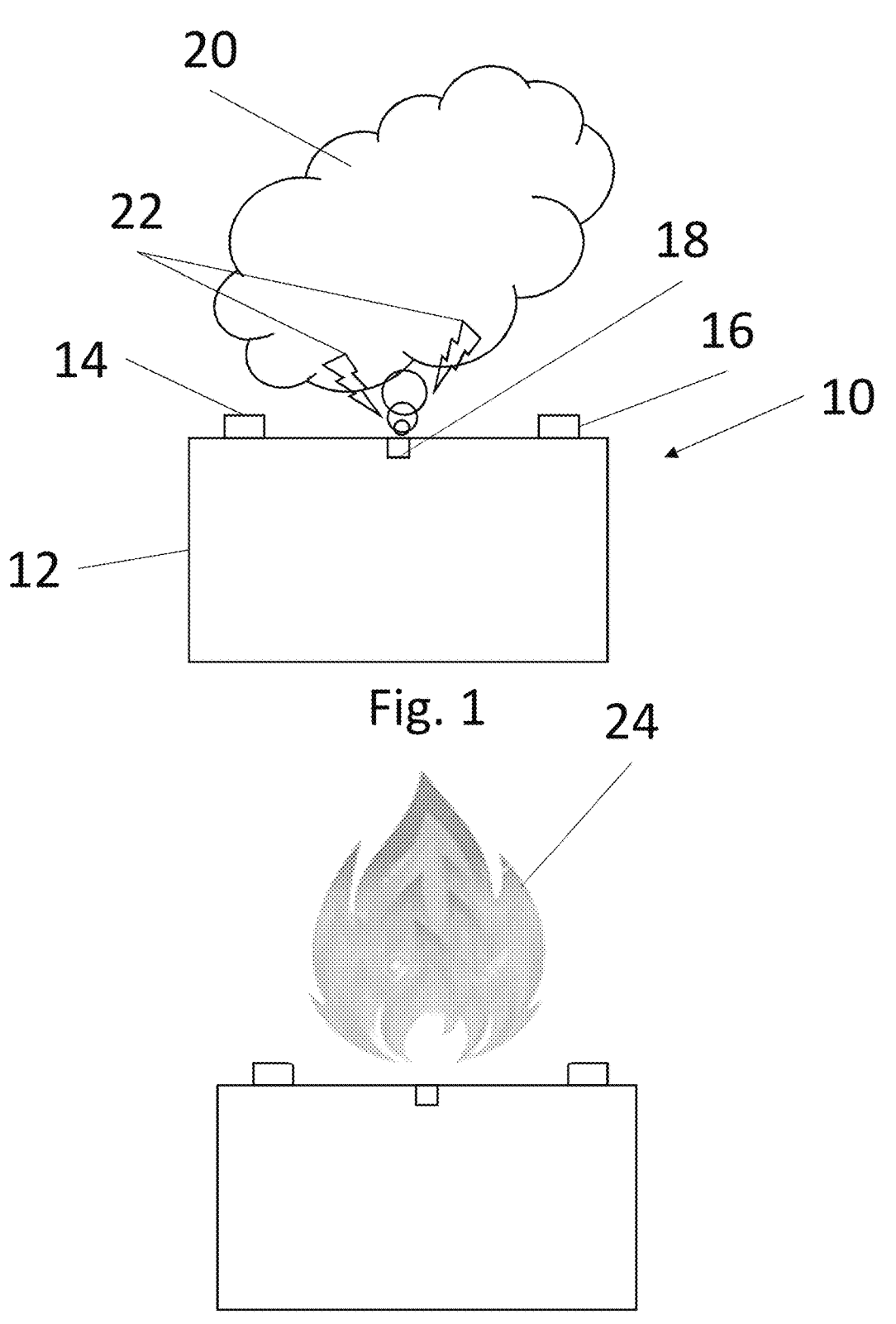
FIG. 1 shows a schematic cross-sectional view of a cell according to the prior art.
FIG. 2 shows a schematic cross sectional view of the cell of FIG. 1 where a fire has started.

FIG. 1 shows a cross-sectional view of a metal ion battery cell, in this case a lithium ion prismatic cell 10. The cell comprises a plurality of electrodes and an electrolyte within a housing 12. Terminal connections 14 and 16 extend from the housing 12. A safety valve 18 is located on a top cover of the housing 12, and is arranged to vent gas from the housing 12 when the pressure reaches a threshold value to prevent undue pressure build up within the housing. A fault may increase the temperature within the cell 10, leading to a flammable gas being generated by the electrodes and electrolyte, which is vented through the safety valve 18 into an area proximate to the cell 10. This is shown by the cloud 20 shown in FIG. 1. As the temperature of the cell 10 rises, the exothermic reaction also increases, leading to further temperature rises. At some point, the temperature will rise to a level at which sparks 22 are generated within the cell 10 and pass through the safety valve. The sparks 22 may ignite the gas 20, leading to a fire 24 as shown in FIG. 2.

Figure 3:
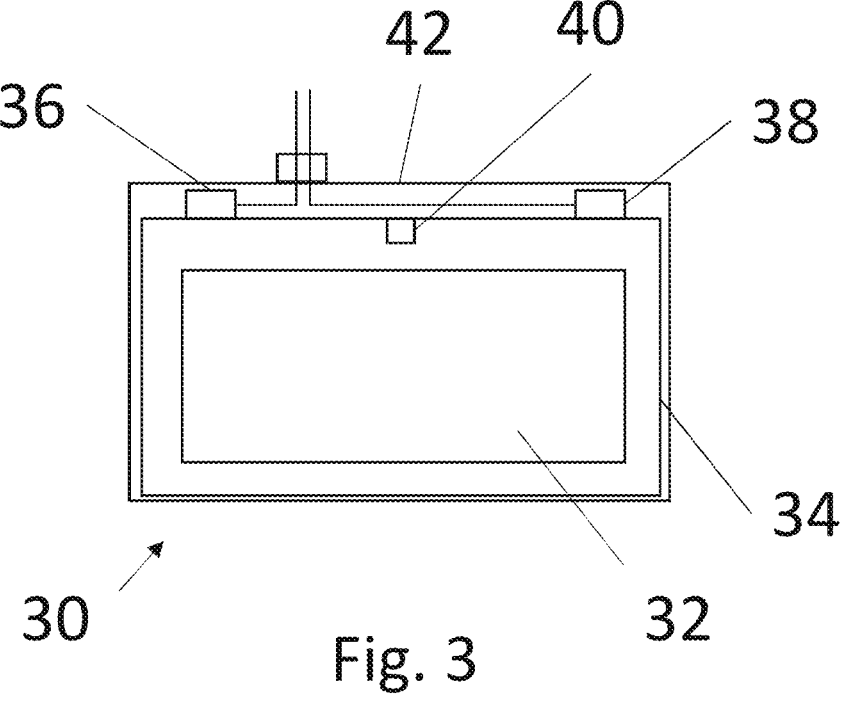
FIG. 3 shows a schematic cross-sectional view of a cell according to a first embodiment of the invention.

FIG. 3 shows a schematic cross-sectional view of a lithium ion prismatic cell 30. The cell 30 comprises a plurality of electrodes and an electrolyte 32 within a housing 34. Terminal connections 36 and 38 extend from the housing. A safety valve 40 is located on the top cover of the housing 34, and is arranged to vent gas from the housing 34 when the pressure reaches a threshold value. The cell 30 further comprises a fabric envelope 42 which surrounds the housing 34. The fabric envelope comprises a low silica felt needled between two silica fabrics, and is dense enough to absorb any sparks that are generated by the cell 30 and travel out through the safety valve 40. If a fault occurs which results in a flammable gas being generated, the flammable gas will pass through the safety valve 40 once the safety pressure within the cell 30 has been reached, and initially be contained within the fabric envelope 42. Any sparks that are generated and pass through the safety valve 40 will pass into the space between the housing 34 and the fabric envelope 42. This space, if any gas is present, will include little or no oxygen, and therefore there will be no fire or explosion caused by the spark prior to that spark being absorbed by the fabric envelope 42.

Figure 4:
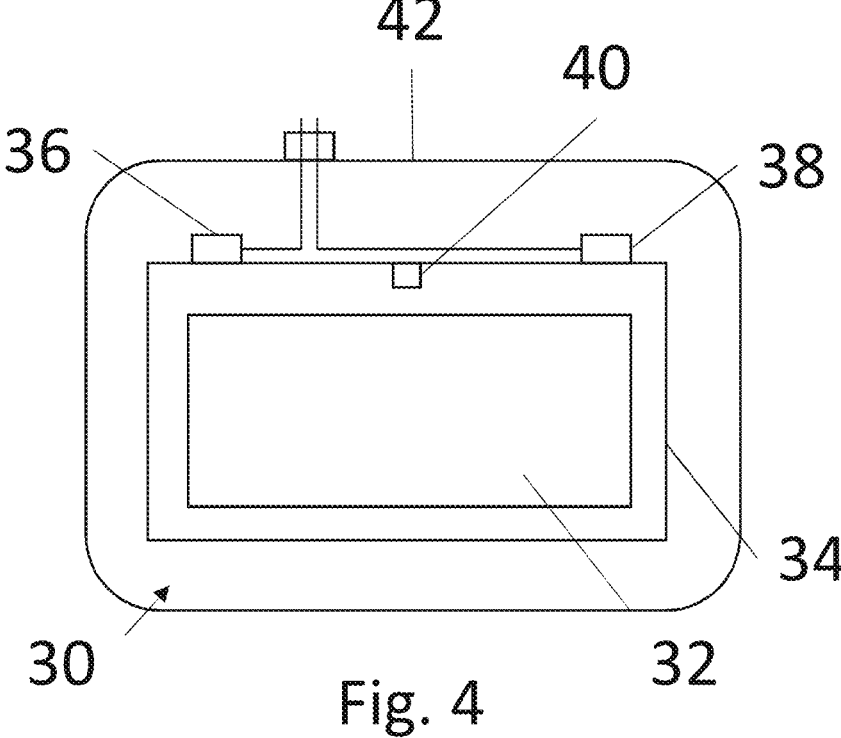
FIG. 4 shows a schematic cross-sectional view of the cell shown in FIG. 3, with the fabric envelope expanded under pressure.

FIG. 4 shows the fabric envelope 42 where a gas build up has caused the expansion of the fabric envelope 42. Any sparks generated will continue to be contained within the fabric envelope 42, which continues to exclude oxygen from the space around the housing 34, and therefore no fire or explosion will result.

Figure 5:
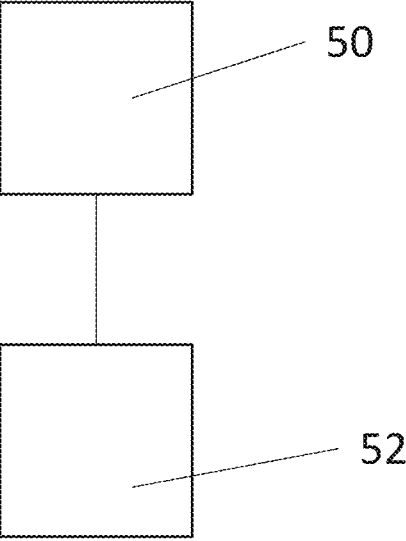
FIG. 5 shows a method of manufacturing a battery cell according to an embodiment of the invention.

FIG. 5 shows a method of manufacturing a lithium ion battery cell 30 comprising provision of a fabric envelope 42 in step 50, and surrounding the housing 34 of the lithium ion battery cell 30 with the fabric envelope 42 in step 52.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In an alternative embodiment to that described above, the fabric envelope may comprise a safety valve arranged to vent gas build up between the housing of the battery cell and inside the envelope.

The lithium ion battery cell may be a cylindrical cell. The lithium ion battery cell may be a pouch cell. The invention may be applied to various other metal ion battery cells, in particular metal ion battery cells that potentially generate flammable gases.

The fabric envelope may be applied to cover a safety valve or vent in a housing of a power module, the power module comprising a plurality of metal ion battery cells. The fabric envelope may be applied to cover a safety valve or vent in a housing of a battery pack, the battery pack comprising a plurality of metal ion battery cells. The battery pack may comprise one or more power modules, each power module comprising a plurality of metal ion battery cells.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A metal ion battery cell comprising a plurality of electrodes and an electrolyte encased within a housing, the housing comprising a safety valve or vent configured to allow gas build up within the housing to vent outside the housing, and a fabric envelope surrounding the housing, such that sparks generated by the metal ion battery cell are contained by the fabric envelope,
  wherein the safety valve is a one way valve arranged to open at 0.9 MPa±0.2 MPa pressure within the lithium ion battery cell, and
  wherein the material of the fabric envelope allows gas to pass through the fabric when the pressure within the envelope is 0.9 MPa ±0.2 MPa.

2. A metal ion battery cell as claimed in claim 1, comprising a lithium ion battery cell.

3. A metal ion battery cell as claimed in claim 2, wherein the lithium ion battery cell is a prismatic lithium ion battery cell.

4. A metal ion battery cell as claimed in claim 2, wherein the lithium ion battery cell is a cylindrical lithium ion battery cell.

5. A metal ion battery cell as claimed in claim 1, wherein the fabric envelope fully surrounds the housing such that no oxygen is present between the housing and the envelope.

6. A metal ion battery cell as claimed in claim 1, wherein the fabric envelope is such that when there is no pressure difference between the inside of the fabric envelope and the outside of the fabric envelope, no gas passes through the fabric envelope.

7. A metal ion battery cell as claimed in claim 1, wherein the fabric envelope is elastically deformable.

8. A metal ion battery cell as claimed in claim 1, wherein the fabric envelope comprises a heat resistant material.

9. A metal ion battery cell as claimed in claim 1, wherein the fabric envelope comprises a felt material needled to or between one or more woven fabrics.

10. A metal ion battery cell as claimed in claim 1, wherein the fabric envelope comprises at least one connection port allowing wires to pass through the fabric envelope and connect to terminals of the metal ion battery cell.

11. A method of manufacturing a metal ion battery cell according to claim 1, the method comprising the steps of: placing a metal ion battery cell in a fabric envelope, such that the housing of the metal ion battery cell is surrounded by the fabric envelope.

12. A power module, the power module comprising a plurality of metal ion battery cells, the plurality of metal ion battery cells encased within a housing, the housing comprising a safety valve or vent configured to allow gas build up within the housing to vent outside the housing, and a fabric envelope surrounding the housing, such that sparks generated by the metal ion battery cell are contained by the fabric envelope,
  wherein the safety valve is a one way valve arranged to open at 0.9 MPa±0.2 MPa pressure within the lithium ion battery cell, and
  wherein the material of the fabric envelope allows gas to pass through the fabric when the pressure within the envelope is 0.9 MPa±0.2 MPa.

13. A battery pack, the battery pack comprising one or more power modules, each power module comprising a plurality of metal ion battery cells, the one or more power modules encased within a housing, the housing comprising a safety valve or vent configured to allow gas build up within the housing to vent outside the housing, and a fabric envelope surrounding the housing, such that sparks generated by the metal ion battery cell are contained by the fabric envelope,
  wherein the safety valve is a one way valve arranged to open at 0.9 MPa±0.2 MPa pressure within the lithium ion battery cell, and
  wherein the material of the fabric envelope allows gas to pass through the fabric when the pressure within the envelope is 0.9 MPa±0.2 MPa.

* * * * *